June 4, 1968      M. RATZSCH ET AL      3,386,488
PROCESS FOR PRODUCING POWDERS FROM PLASTIC AND WAX MASSES
Filed March 18, 1966
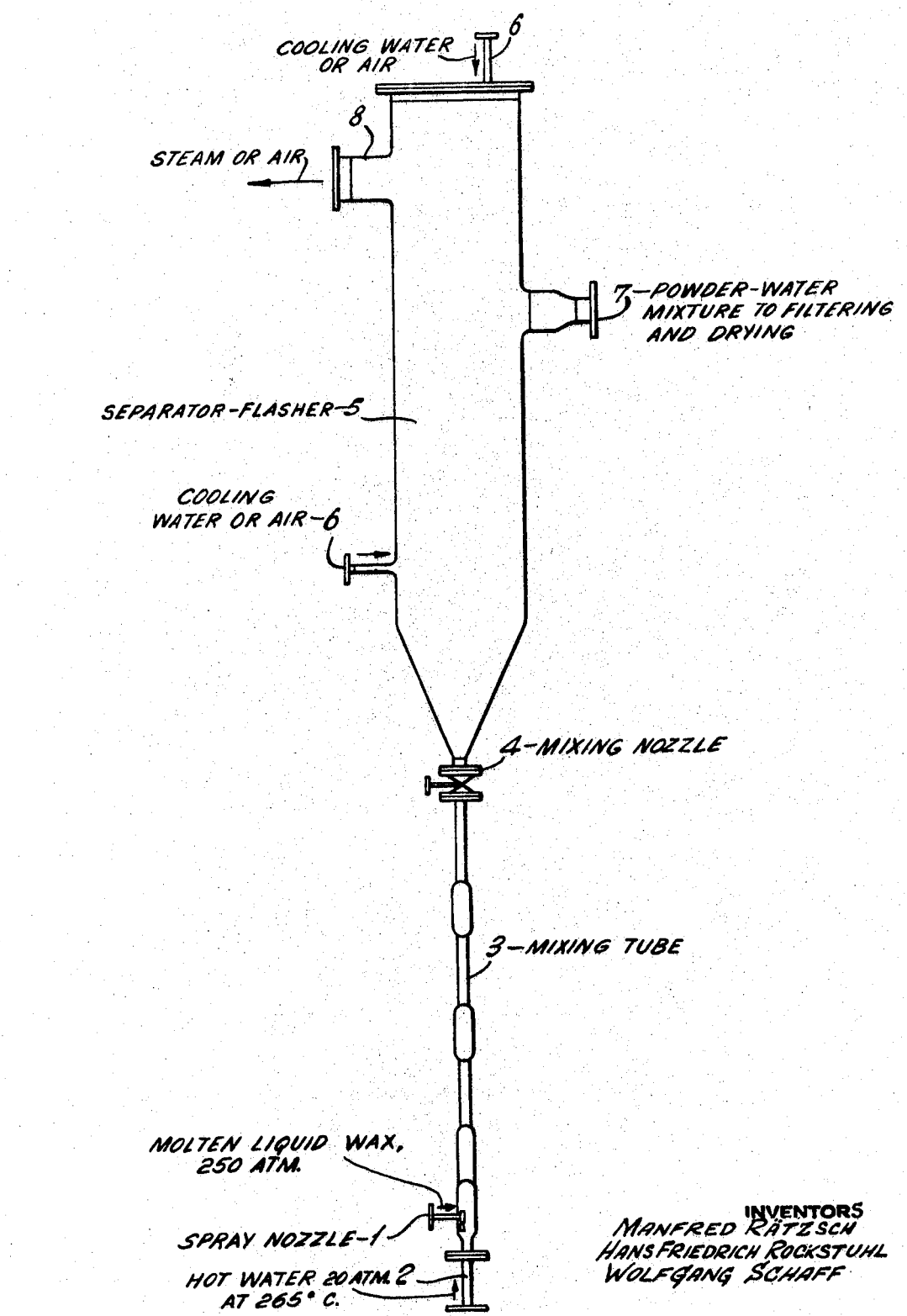
INVENTORS
MANFRED RATZSCH
HANS FRIEDRICH ROCKSTUHL
WOLFGANG SCHAFF United States Patent Office 3,386,488
Patented June 4, 1968

3,386,488
PROCESS FOR PRODUCING POWDERS FROM PLASTIC AND WAX MASSES
Manfred Ratzsch and Hans-Friedrich Rockstuhl, Leuna, and Wolfgang Schaff, Bad Durenberg, Germany, assignors to VEB Leuna-Werke "Walter Ulbricht," Leuna, Germany
Filed Mar. 18, 1966, Ser. No. 536,946
5 Claims. (Cl. 159—48)

ABSTRACT OF THE DISCLOSURE

Hot water at 265° C. and molten liquid wax both at superatmospheric pressure are impinged and mixed in a mixing tube and then released thru an orifice into a flash separating chamber from which steam and air are removed and separated from a wax powder and water mixture which latter is sent to filtering and drying stages.

---

The present invention relates to the production of powder from plastic and wax masses, and more particularly to the production of powders of high purity from plastics or waxes in an economical and easily controllable manner.

The method of this invention is particularly applicable, as will be explained in greater detail below, to the production of powders of high purity from plastics or waxes by spraying the same in a molten condition, said powders being stable against hot water at temperatures above their melting points.

It is known to mechanically subdivide or pulverize plastic masses by milling. Thermoplastic resins, however, can be converted into powder form by dry milling only with great difficulty, because as a result of their low heat conductivity a marked dissipation of the heat resulting from the rubbing is prevented, so that the plastic will soften and bake together during the milling.

This considerable disadvantage is avoided in a known manner by spraying the material with liquid nitrogen so as to rapidly cool the same, whereby a highly brittle material is obtained which requires relatively slight amounts of energy for subdividing the same. In addition to the considerable costs of the installations required for this process, there are also high material costs, so that such installations are relatively uneconomical particularly when grain sizes below 100 mµ are desired.

It is further known to add, for example 10% of methanol to polyethylene, to obtain a material which can be easily milled. This process, however, exhibits the disadvantage that to the costs of the milling, there are also costs involved in the mixing and the removal of the solvent.

It is also known to produce polyolefins in powder form by heating the polyolefin under stirring until it is molten and then quenching the melt, while still stirring. However, because of the poor heat conductivity of the polymers this discontinuous process can only be carried out with small throughput amounts to give rather small yields of final product.

Furthermore, it is also known to dissolve plastics in suitable solvents, to spray the solutions and to drive off the solvents from the sprayed drops, whereby the plastic precipitates in powder form. Suitable solvents for this purpose are benzene, alkyl-substituted benzenes, cyclohexane, alkyl-substituted naphthalene, hydrogenated naphthalene, paraffins and chlorinated paraffins.

Moreover, it is known to produce pulverulent plastics by mixing the plastic with a solvent-nonsolvent mixture and subsequently stirring the same at high temperatures. Thus, for example, for the production of polyethylene powders, mixtures of hydrocarbons such as petroleum ether, cyclohexane, benzene, octane or xylene, with a strongly polar solvent, such as ethylene glycol, ethanol, methanol or butyl alcohol, have been used.

Still further, it is known to introduce a nonsolvent into a solution of a plastic at such temperature that the plastic precipitates as a granular powder and the solvent is simultaneously evaporated.

Yet another method comprises the cooling of a hot, saturated solution of the plastic in order to obtain the plastic in pulverulent form.

All the processes which work with solvents require a preliminary dissolution process, that is the solution of the plastic, and a subsequent removal of the solvent, which, as a consequence of the large surface of plastic particles and the limitation of suitable temperatures comprise considerable technological difficulties. A complete removal of the solvent is, however, a prerequisite for making the powder suitable for all intended purposes.

Another known method for the production of plastic powders comprises the spraying of molten plastics in a cooling tower. This method requires large amounts of inert gases, which, of course, adds to the high cost of the process.

Finally, high pressure polyethylene powder can be directly obtained from the high pressure polyethylene reactor by flash evaporation of a reaction mixture. This method, however, requires sudden pressure drop from 1500 atmospheres above to normal atmospheric pressure, and because of the possibility of a static charge, there are great dangers in the process. Furthermore, the loose weight of such products is always very low.

It is accordingly a primary object of the present invention to provide a method of producing powders from plastics or waxes, which avoids all of the difficulties of the above enumerated known processes.

It is still another object of the prevent invention to provide a simple and economical method of producing powders of small granular size from plastic or waxy masses without the dangers of static charges and without any of the other disadvantages of the known processes.

It is still a further object of the present invention to provide a simple and direct method of producing small, particulate powders from waxy or plastic masses, such as from polyethylenes, in an easily controllable and easily reproducible manner.

Other objects and advantages of the present invention will be apparent from a further reading of the specification and of the appended claims.

With the above and other objects in view, the present invention mainly comprises mixing a molten plastic or wax, which is stable with respect to hot water at a temperature above the melting point of the plastic or wax, with hot water at superatmospheric pressure and subjecting the thus obtained liquid mixture at said temperature above the melting temperature of said plastic or wax to flash evaporation under cooling, thereby directly converting the plastic or wax into small particulate condition.

According to the preferred embodiment of the invention the amount of hot water in the mixture of the plastic or wax should be more than about 80% by weight.

The cooling of the mixture is preferably accomplished by means of air or water.

The flash evaporation of the mixture is preferably carried out into a separator vessel over a mixing nozzle. This results in a particularly good mixing of the cooling agent with the mixture of molten plastic or wax and hot water which is to be flash evaporated.

An apparatus for carrying out the method of the invention is illustrated diagrammatically by way of example in the sole figure of the accompanying drawing.

The molten liquid plastic or liquid wax is withdrawn from the head of a screw press of a heated pressure container or from a normal pressure container by means of a pump, for example a gear pump, or even in directly liquid condition under pressure from the product separator associated with the synthesis installation, and conveyed through spray nozzle 1 of a mixing tube 3 while hot water is simultaneously fed thereto through an inlet conduit tube 2. The construction of the mixing tube 3 provides a strong turbulence and thereby an intensive mixing of the molten plastic or wax with the hot water. The junction of the mixing tube 3 is provided with a mixing nozzle 4 which leads to the separating vessel 5 in which the flash evaporation takes place. The separating vessel 5 is provided with a tube 6 for cooling water or air introduction and is provided with an outlet tube 7 for the powder water mixture; it is further provided with an outlet conduit 8 for the steam and air removal.

The method is technologically very simple and can be carried out without the use of costly installations. The mixture of powder and water which is finally obtained from the method can easily be separated in known manner by a filtering and drying process, for example by filtering over a rotary filter and subsequent air drying, for example by means of a stream of air.

By variation of the temperature in the hot water and the amount thereof, it is possible to obtain powder whose average diameter is about 30 m$\mu$.

The following examples are given to further illustrate the invention. However, the scope of the invention is not meant to be limited to the specific details of the examples.

EXAMPLE 1

From a high pressure separator for polyethylene 15 kg. of molten polyethylene are withdrawn per hour at a temperature of 240° C. through a bottom valve at 250 atmospheres, and the molten polyethylene is introduced through an inlet nozzle into a mixing tube of 3 m. length having an inner diameter of 5 mm.; the tube has a periodically arranged 3-bellied extension each of 40 mm. diameter and 150 mm. length. 165 kg. of hot water at 30 atmospheres pressure and 265° C. temperature is likewise introduced into the tube per hour. The thus obtained polyethylene-water mixture is then passed through a mixing nozzle into a separator vessel of 4 m. length and 0.4 m. diameter and flash evaporated to normal pressure. Into this vessel there are simultaneously passed from a closed condensation circulator 2 m.$^3$ of condensate per hour at a temperature of 20° C. so as to aid in the cooling, whereby a water mist is formed in the container. The condensate with the resulting finely granular polyethylene powder is continuously withtdrawn through an outlet tube and the powder is separated from the water by means of a rotary filter. The polyethylene powder, after being peeled from the rotary filter drum is subjected to air stream drying. The condensate is cooled and again introduced into the closed circulating system.

The polyethylene powder is obtained in quantitative amount from the introduced plastic melt. The powder exhibits up to 70% by weight a grain size of 15–20 m$\mu$, and up to 30% by weight a grain size of 20–30 m$\mu$.

The polyethylene powder which is obtained in this manner is particularly useful for whirl sintering.

EXAMPLE 2

18 kg. of polyethylene wax having a melting range of 109–115° C. and a hardness of 372 kg./cm.$^2$ are removed each hour through a bottom valve from a high pressure separator, the temperature of removal being about 240° C. The molten wax is introduced into the apparatus described in Example 1. Into the mixing tube there is introduced at the same time 150 kg. per hour of hot water under a pressure of 30 atmospheres and at a temperature of 265° C. The flash evaporation of the mixture, the additon of condensate, and the separation of the resulting powder proceed as described in Example 1.

The polyethylene wax powder is thus obtained in quantitative yield. The powder exhibits up to 50% a grain size of 10–18 m$\mu$ and up to 50% a grain size of 18–30 m$\mu$. The loose weight amounts to 545 g./l.

The obtained powder is particularly suitable as a compounding component for paraffins.

While the invention has been described in particular in connection with specific methods and apparatus for the carrying out of the method, it is to be understood that variations and modifications can be made without departing from the spirit or scope of the invention. Such variations and modifications are accordingly meant to be comprehended within the scope and range of equivalents of the appended claims.

We claim:

1. Method of producing powders of high purity from ethylene polymers which at above the melting temperature thereof are stable with respect to hot water, which comprises introducing said substance in a molten condition under superatmospheric pressure into a mixing zone, mixing it therein with hot water, likewise admitted at superatmospheric pressure into said zone, and thereafter subjecting the thus obtained pressurized liquid mixture having a temperature above 240° C., which is above the melting point of said substance, and a pressure above 30 atmospheres to flash evaporation, thus effecting a cooling below the melting point of said substance whereby said molten substance is converted into a powder having an average diameter of 10 to 30 m$\mu$.

2. Method according to claim 1 wherein the amount of hot water in the mixture is more than about 80% by weight of the mixture.

3. Method according to claim 2 wherein the mixture is further cooled during the flash evaporation by means of a separately admitted fluid coolant.

4. Method according to claim 3 wherein said coolant is selected from the group consisting of air and water.

5. Method according to claim 1 wherein the flash evaporation of the mixture is carried out through a mixing nozzle.

References Cited

UNITED STATES PATENTS

| 3,042,970 | 7/1962 | Terenzi | 264—11 |
| 3,050,113 | 8/1962 | Rundquist | 159—13 |
| 3,058,159 | 10/1962 | Ishizuka et al. | 264—13 |
| 3,202,647 | 8/1965 | Todd et al. | 260—94.7 |
| 3,306,342 | 2/1967 | Salvo et al. | 159—47 |
| 3,102,865 | 9/1963 | Sneary et al. | 260—94.7 |

FOREIGN PATENTS 824,193   11/1959   Great Britain.

NORMAN YUDKOFF, *Primary Examiner.*

WILBUR L. BASCOMB, Jr., *Examiner.*

J. SOFER, *Assistant Examiner.*